US012750613B2

(12) United States Patent
Boessel et al.

(10) Patent No.: US 12,750,613 B2
(45) Date of Patent: Sep. 29, 2026

(54) INTERACTIVE FOODWARE SYSTEMS AND METHODS TO GENERATE DATA FOR LOCATION AND MOVEMENT OF UTENSIL, AND CONTROLLER THAT INSTRUCTS SPEAKER TO GENERATE AUDIO DATA BASED ON LOCATION OF THE UTENSIL

(71) Applicant: Universal City Studios LLC, Universal City, CA (US)

(72) Inventors: Thomas Michael Boessel, Orlando, FL (US); Gregory Shellman Hall, Orlando, FL (US)

(73) Assignee: Universal City Studios LLC, Universal City, CA (US)

( * ) Notice: Subject to any disclaimer, the term of this patent is extended or adjusted under 35 U.S.C. 154(b) by 979 days.

(21) Appl. No.: 17/895,865

(22) Filed: Aug. 25, 2022

(65) Prior Publication Data

US 2023/0370755 A1 Nov. 16, 2023

Related U.S. Application Data

(60) Provisional application No. 63/341,308, filed on May 12, 2022.

(51) Int. Cl.

| | |
|---|---|
| ***H04R 1/02*** | (2006.01) |
| ***A47G 19/02*** | (2006.01) |
| ***A47G 21/02*** | (2006.01) |
| ***A47G 21/04*** | (2006.01) |
| ***H04S 7/00*** | (2006.01) |
| *G06V 40/13* | (2022.01) |
| *H05B 6/00* | (2006.01) |

(52) U.S. Cl.
CPC ........... *H04R 1/025* (2013.01); *A47G 19/025* (2013.01); *A47G 21/023* (2013.01); *A47G 21/04* (2013.01); *H04S 7/303* (2013.01); *G06V 40/1306* (2022.01); *H05B 6/00* (2013.01)

(58) Field of Classification Search
None
See application file for complete search history.

(56) References Cited

U.S. PATENT DOCUMENTS 9,146,147 B1 * 9/2015 Bakhsh .................. A47G 21/02
9,198,605 B2 12/2015 Contant
(Continued)

FOREIGN PATENT DOCUMENTS

CN 203106881 U 8/2013
KR 20140126118 A 10/2014

OTHER PUBLICATIONS

"Tablemation—World's #1 Dinning Experience", 2022, 3 pages, Tablemation Studios, https://tablemationstudios.com/.
(Continued)

*Primary Examiner* — Haris Sabah
(74) *Attorney, Agent, or Firm* — Fletcher Yoder, P.C.

(57) ABSTRACT

A foodware system includes an identifier coupled to a utensil configured to be used by a user to engage a food item. The foodware system also includes a detector configured to generate data indicative of a location of the utensil, a movement of the utensil, or both based on detection of the identifier. The foodware system further includes a controller communicatively coupled to the detector and configured to instruct a speaker to generate audio data based on the location of the utensil, the movement of the utensil, or both.

19 Claims, 5 Drawing Sheets

(56) References Cited

U.S. PATENT DOCUMENTS

| | | | | |
|---|---|---|---|---|
| 9,449,219 | B2 | 9/2016 | Bilet et al. | |
| 9,622,007 | B2 | 4/2017 | Cho et al. | |
| 9,782,027 | B2 | 10/2017 | Kramer | |
| 9,860,666 | B2 | 1/2018 | Laitinen | |
| 9,939,312 | B2 | 4/2018 | Bakhsh | |
| 10,048,835 | B2 | 8/2018 | Cotier et al. | |
| 10,520,889 | B2 | 12/2019 | Zschau et al. | |
| 10,531,215 | B2 | 1/2020 | Kim et al. | |
| 2010/0240962 | A1* | 9/2010 | Contant | A61B 5/7405 600/300 |
| 2014/0018636 | A1* | 1/2014 | Contant | A61B 5/1112 600/595 |
| 2014/0349257 | A1* | 11/2014 | Connor | A61B 5/681 434/127 |
| 2016/0066724 | A1 | 3/2016 | Cowley et al. | |
| 2018/0315138 | A1 | 11/2018 | Riddiford et al. | |
| 2020/0000258 | A1 | 1/2020 | Dubey et al. | |
| 2021/0383084 | A1* | 12/2021 | Johnson | G06K 7/10237 |

OTHER PUBLICATIONS

Screen captures from Twitter video clip entitled "Le Petit Chef," 2 pages, uploaded on Aug. 4, 2022 by user "Alvin Foo". Retrieved from Internet: <https://twitter.com/i/status/1555633570663878656>.

PCT/US2023/021913 Invitation to Pay Additional Fees mailed Aug. 30, 2023.

* cited by examiner

INTERACTIVE FOODWARE SYSTEMS AND METHODS TO GENERATE DATA FOR LOCATION AND MOVEMENT OF UTENSIL, AND CONTROLLER THAT INSTRUCTS SPEAKER TO GENERATE AUDIO DATA BASED ON LOCATION OF THE UTENSIL

CROSS-REFERENCE TO RELATED APPLICATION

This application claims priority to and the benefit of U.S. Provisional Application No. 63/341,308, entitled "INTERACTIVE FOODWARE SYSTEMS AND METHODS," filed May 12, 2022, which is hereby incorporated by reference in its entirety for all purposes.

BACKGROUND

This section is intended to introduce the reader to various aspects of art that may be related to various aspects of the present disclosure. This discussion is believed to be helpful in providing the reader with background information to facilitate a better understanding of the various aspects of the present disclosure. Accordingly, it should be understood that these statements are to be read in this light and not as admissions of prior art.

An amusement park generally includes attractions that provide various experiences for users. For example, the amusement park may include different attractions, such as a roller coaster, a drop tower, a log flume, and so forth. Some attractions may include environments that provide effects, such as auditory stimuli, haptic stimuli, visual stimuli, and/or other special effects, which help to provide immersive experiences for the users. The amusement park may include other types of attractions and/or venues, such as restaurants that provide dining experiences for the users.

SUMMARY

Certain embodiments commensurate in scope with the originally claimed subject matter are summarized below. These embodiments are not intended to limit the scope of the disclosure, but rather these embodiments are intended only to provide a brief summary of certain disclosed embodiments. Indeed, the present disclosure may encompass a variety of forms that may be similar to or different from the embodiments set forth below.

In one embodiment, a foodware system includes an identifier coupled to a utensil configured to be used by a user to engage a food item. The foodware system also includes a detector configured to generate data indicative of a location of the utensil, a movement of the utensil, or both based on detection of the identifier. The foodware system further includes a controller communicatively coupled to the detector and configured to instruct a speaker to generate audio data based on the location of the utensil, the movement of the utensil, or both.

In one embodiment, a method of providing an immersive dining experience includes identifying, via one or more processors and based on data obtained by one or more sensors, an interaction between a food item and a user. The method also includes projecting, via a projector, an image onto the food item in response to the interaction between the food item and the user.

In one embodiment, a foodware system includes one or more sensors configured to obtain data indicative of an interaction between a food item and a user. The foodware system further includes a controller communicatively coupled to the one or more sensors and configured to instruct a projector to project an image onto the food item in response to the interaction between the food item and the user.

BRIEF DESCRIPTION OF THE DRAWINGS

These and other features, aspects, and advantages of the present disclosure will become better understood when the following detailed description is read with reference to the accompanying drawings in which like characters represent like parts throughout the drawings, wherein.

DETAILED DESCRIPTION

Figure 1:
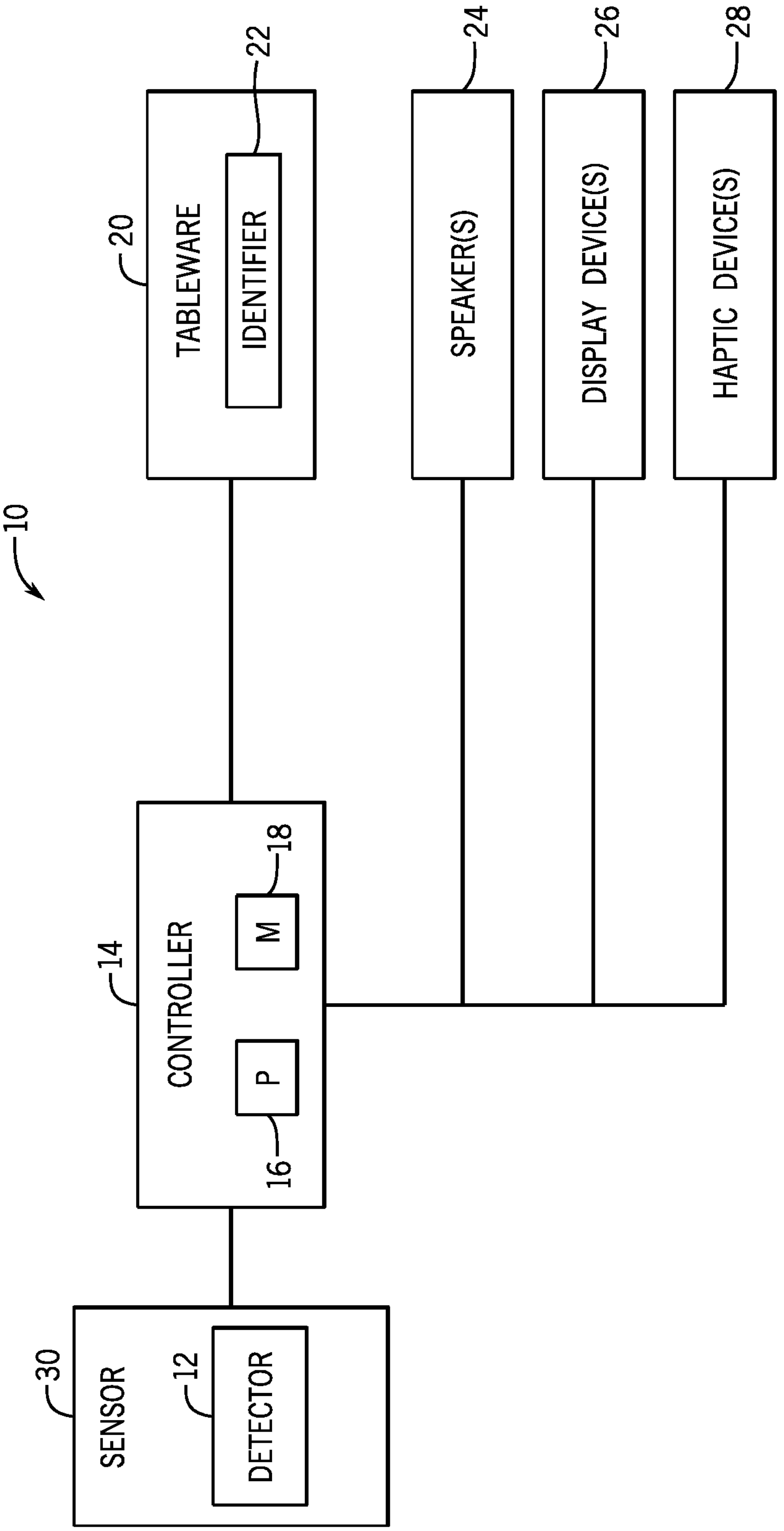
FIG. 1 is a block diagram of a foodware system that generates auditory, haptic, and/or visual stimuli during a dining experience, in accordance with an embodiment of the present disclosure.

One or more specific embodiments of the present disclosure will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present disclosure, the articles "a," "an," and "the" are intended to mean that there are one or more of the elements. The terms "comprising," "including," and "having" are intended to be inclusive and mean that there may be additional elements other than the listed elements. Additionally, it should be understood that references to "one embodiment" or "an embodiment" of the present disclosure are not intended to be interpreted as excluding the existence of additional embodiments that also incorporate the recited features.

The present disclosure relates generally to the field of special effects for use in interactive environments, such as an amusement park. More specifically, the present disclosure is related to systems and methods for generating auditory stimuli (e.g., binaural audio), haptic stimuli, and/or visual stimuli during a dining experience. As used herein, binaural audio may create a three-dimensional (3D) stereo sound sensation for a user based on how a human hearing system receives and processes sounds. For example, if a dog barks in a left ear of the user, the sound of the bark may take a few more seconds to reach a right ear of the user compared to the left ear. The sound of the bark may also be louder in one ear than the other ear. Binaural audio accounts for such differences in time and strength associated with sounds. By localizing sounds based on orientation and/or movement of a human head, binaural audio may provide an immersive experience to the user. For example, the user may hear a whisper in one ear or hear a bird flying overhead.

Further, the haptic stimuli may create a sensation of touch for the user, such as by applying forces, vibrations, and/or motions to the user. As used herein, the haptic stimuli may include scents (e.g., olfactory sensation). Further, the visual stimuli may include a projected image (e.g., a two-dimensional [2D] or 3D image) that may be observed by the user (e.g., with or without viewing glasses). In one embodiment, projection mapping techniques may be employed to generate the projected image and to project the projected image onto tableware (e.g., a plate, a tabletop) and/or food item(s) during the dining experience (e.g., overlaid image to create virtual enhancements to and/or virtual features on the tableware and/or the food item(s)). The projection mapping techniques may additionally or alternatively be employed to project the projected image onto any other type of display surface, such as a traditional movie screen. A 2D image refers to what is typically considered a "flat" image that appears to exist in two dimensions when viewed by the user, while a 3D image is also a "flat" image that is provided in a manner that appears to exist in three dimensions when viewed by the user. Both the 2D image and the 3D image may be provided on a non-flat surface, such as a food item, textured tablecloth, or the like.

With the foregoing in mind, an amusement park or other venue may include a foodware system (e.g., interactive foodware system) that is configured to create special effects by generating auditory, visual, and/or haptic stimuli during a dining experience. Indeed, combinations of certain hardware configurations (e.g., circuitry), software configurations (e.g., algorithmic structures and/or modeled responses), as well as certain attraction features may be utilized to provide users with an immersive dining experience.

The foodware system may include tableware with sensing components (e.g., sensors). Additionally or alternatively, the sensing components may be distributed about a dining environment (e.g., at locations separate from the tableware). Additionally, the foodware system may include speakers to generate auditory stimuli (e.g., binaural audio), haptic devices to generate haptic stimuli, and/or projectors or other display devices to generate visual stimuli based on data obtained by the sensing components. The tableware may include plates, bowls, pans, containers, cups, utensils/cutlery, tabletops, napkins, and the like. The foodware system may track various parameters of the tableware, food item(s), and/or user(s). For example, the foodware system may track a food item (e.g., edible food item, including solid food items and/or liquid food items, such as water and other drinks), such as movement of the food item (e.g., movement of the food item relative to the tableware, wherein the movement of the food item is caused by or imparted by the user, such as via cutlery). The foodware system may track the tableware, including movement of the tableware (e.g., movement of cutlery relative to the food item, wherein the movement of the cutlery is caused by or imparted by the user). Then, the foodware system may provide the auditory, visual, and/or haptic stimuli based on the movement of the food item and/or the movement of the tableware. The foodware system may determine eating habits and patterns of the user (e.g., a type of food item(s) served to the user and/or consumed by the user, an amount of each type of food item served to the user and/or consumed by the user, an amount of each type of food item that is served to the user and not consumed by the user, a rate of consumption of each type food item by the user, an order of consumption when different types of food items are presented to the user, and/or sounds made by the user when eating each type of food item). In such cases, the foodware system may provide the auditory, visual, and/or haptic stimuli based on the eating habits and patterns of the user.

As a specific example to facilitate discussion, in response to determining that the user is manipulating a knife to slice a loaf of bread on a plate, the foodware system may generate binaural audio that creates an effect of a hissing sound that appears to the user to originate from the loaf of bread and visual imagery that portrays snakes that appear to the user to slither from the loaf of bread onto the plate. It should be appreciated that the foodware system also temporally coordinates the auditory, visual, and/or haptic stimuli to one another, as well as to detected movement (e.g., the movement of the cutlery and/or the food item, such as the movement of the knife and the bread) to provide an overall immersive effect for the user.

To generate the binaural audio and other effects in this way, a controller of the foodware system receives data from various sensing components (e.g., detectors and other sensors). Non-limiting examples of the detectors may include a radio frequency identification (RFID) reader, a near-field communication (NFC) reader, a barcode scanner, a quick response (QR) code scanner, and/or a camera. The detectors may be communicatively coupled to the controller of the foodware system. Similarly, non-limiting examples of identifiers that are detectable by the detectors may include a RFID tag, a NFC tag, a barcode, and a QR code. Some additional non-limiting examples of identifiers that are detectable by the detectors may include a visual pattern, a retro-reflective material with a particular color (e.g., visible or invisible to humans), a shape of a material or item (e.g., unique edges along a tableware item). In one embodiment, respective identifiers may be coupled to and/or integrated into respective tableware. For example, one identifier, such as a RFID tag, may be coupled to the knife used to slice the loaf of bread. The detector, such as a RFID reader, may identify a location and/or a movement of the knife based on detection of (e.g., communication with) the identifier. Then, the detector may send location and/or movement data associated with the knife to the controller. The controller may process the location and/or movement data associated with the knife to determine that the movement of the knife corresponds to a cutting or slicing motion (e.g., classify the movement of the knife by referencing a library of stored motions and/or via one or more algorithms). Then, as noted herein, the controller may instruct a speaker to generate the binaural audio, a projector to project the visual imagery, and so on to create an immersive dining experience for the user.

The controller may process the data generated by and received from the detector(s) and/or other sensors to track the user (e.g., an action of the user), the food item(s) (e.g., a type of food item(s), a location of food item(s), a displacement of food item(s), a weight of food item(s)), and/or tableware (e.g., a location of cutlery(s), a movement of cutlery(s)). For example, the controller may utilize any of various tracking techniques and tools, such as RFID monitoring, NFC monitoring, proximity sensor(s), a coordinate grid(s), a camera(s), a motion sensor(s), a food displacement sensor(s), a food weight sensor(s), a color marker(s), computer vision, and so forth. Based on the data related to the user, the food item(s), the tableware, and the dining environment, the controller may effectively generate responsive and/or interactive auditory, haptic, and/or visual stimuli during the dining experience. Further, the controller may transmit the data and/or related information to a computing device, server, remote server, and the like associated with a restaurant or dining attraction personnel. The data and/or the related information may help the restaurant in preparing and customizing food according to users' eating habits and patterns. For example, in addition to tracking the types of food item(s) ordered, the restaurant may also gain insight from the types of food item(s) ordered but not consumed by the user (e.g., food remaining on a plate).

Turning to the figures, FIG. 1 illustrates a block diagram of an embodiment of a foodware system 10 (e.g., an interactive foodware system). As shown, the foodware system 10 may include a detector(s) 12, a controller 14 (e.g., a programmable logic controller or computer), tableware 20, a speaker(s) 24, a display device(s) 26, and/or a haptic device(s) 28. It should be appreciated that the foodware system 10 may omit certain elements that are shown in FIG. 1 and/or may include additional elements, such as lighting elements (e.g., light emitters) that provide special lighting effects. The controller 14 may include a processor(s) 16 and a memory device(s) 18. Further, each item of tableware 20 may be coupled to a respective identifier 22.

The detector(s) 12, the tableware 20 (e.g., including the respective identifier(s) 22), the speaker(s) 24, the display device(s) 26, and/or the haptic device(s) 28 may be communicatively coupled to the controller 14. The detector(s) 12 may include any suitable type of detector that is configured to detect the respective identifier(s) 22. More specifically, the detector(s) 12 may include any suitable type of detector that is configured generate data (e.g., signals) indicative of a location and/or a movement of the tableware 20 via detection of the respective identifier(s) 22. For example, the detector(s) 12 may include a radio frequency identification (RFID) reader, a near-field communication (NFC) reader, a barcode scanner, a quick response (QR) code scanner, a camera, or any combination thereof. In such cases, the identifier(s) 22 may include corresponding detectable or readable identifiers, such as a RFID tag, a NFC tag, a barcode, and a QR code, or any combination thereof. Additionally or alternatively, the identifier(s) 22 may include a visual pattern, a retro-reflective material with a particular color (e.g., visible or invisible to humans), and/or a shape of a material or item (e.g., unique edges along a tableware item).

Thus, in operation, one identifier 22 may be coupled to and/or integrated into a first piece of tableware 20 (e.g., fork) and/or another identifier 22 may be coupled to and/or integrated into a second piece of tableware 20 (e.g., plate), and so on. Then, the detector(s) 12 may generate the data indicative of the respective location and/or the respective movement of the first piece of tableware 20 and/or the second piece of tableware 20 via the detection of the identifiers 22. In particular, the detector(s) 12 may generate the data indicative of the location and/or the movement of the first piece of tableware 20 and the second piece of tableware 20 by periodically and/or continuously detecting and tracking the identifiers 22 (e.g., in three-dimensional [3D] space within an environment, such as a show environment or a dining environment).

The detector(s) 12 may provide the data indicative of the location and/or the movement of the tableware 20 to the controller 14, such as periodically and/or continuously during an experience (e.g., a show experience or a dining experience). The controller 14 may execute instructions to process the data to determine the location and/or the movement of the tableware 20. In one embodiment, the controller 14 may reference one or more databases (e.g., lookup tables) to identify a particular piece of tableware 20 that is associated with the identifier 22. Further, the controller 14 may also reference the one or more databases to identify a user that is at least currently associated with the particular piece of tableware 20 and/or the identifier 22. For example, the user may be associated with the identifier 22 upon purchasing the identifier 22 (e.g., a band), and then the user may reuse the identifier 22 with multiple different pieces of tableware 20 over time (e.g., attach to a fork during one experience, then attach to another fork during another experience). As another example, the user may be associated with the piece of tableware 20 and the identifier 22 of the piece of tableware 20 (e.g., integrated into the piece of tableware 20 or otherwise fixed to the piece of tableware 20) upon purchasing the tableware 20, and then the user may reuse the piece of tableware 20 over time. As yet another example, the identifier 22 may be integrated into the piece of tableware 20 or otherwise reused with the piece of tableware 20, wherein the piece of tableware 20 is reused by multiple different user over time. In such cases, the piece of tableware 20 and the identifier 22 of the piece of tableware 20 may be temporarily assigned to or associated with the user during the experience (e.g., upon sitting down at a table).

In this way, the controller 14 may access information about characteristics of the particular piece of tableware 20 (e.g., a type, such as a knife or a plate) and/or historical data related to prior experiences of the user (e.g., the user reacted positively to certain special effects). However, it should be appreciated that the techniques disclosed herein may be carried out without associating the tableware 20, the identifier 22, and/or the user to one another. For example, the detector(s) 12 may detect any identifier 22 within range and/or the other sensors may be utilized, and then the controller 14 may control other elements accordingly.

In one embodiment, the controller 14 may execute instructions to control the speaker(s) 24 to generate audio data (e.g., binaural audio), control the display device(s) 26 to generate visual imagery, and/or control the haptic device(s) 28 to generate tactile outputs based on the data indicative of the identifier 22, the location of the tableware 20, and/or the movement of the tableware 20 received from the detector(s) 12. Further, the controller 14 may receive and process other types of data to determine when and how to operate the speaker(s) 24, the display device(s) 26, and/or the haptic device(s) 28. For example, the controller 14 may receive and process data indicative of a type of the tableware 20, a type of food item(s) served to the user, a location of the food item(s) (e.g., a food location of the food item(s)), a movement of the food item(s) (e.g., a food movement of the food items), a location of the user (e.g., a user location of the user), a movement of the user (e.g., a user movement of the user), and/or a body position of the user (e.g., an orientation of a head of the user). The controller 14 may also derive other information from the data, such as relative positions of the food item(s) and the tableware 20 (e.g., movement of the tableware 20 relative to a particular food item) and/or interactions between the food item(s) and the tableware 20 (e.g., contact between a particular food item and the tableware 20).

As shown, the foodware system 10 may include the detector(s) 12 that are configured to detect the identifier 22 (e.g., via radio frequency communications, code reading techniques, and/or image processing techniques), as well as one or more other sensors 30 that operate to collect the other types of data. The one or more sensors 30 may include camera(s), motion sensor(s), food weight sensor(s), food displacement sensor(s), or any combination thereof. It should be appreciated that the one or more sensors 30 may collect the data described herein via any suitable techniques. For example, the detector(s) 12 may be configured to detect the identifier 22 (e.g., obtain a unique identifier of the RFID tag or other code), which may enable association with a particular piece of tableware 20 and/or the user. The detector(s) 12 may also continue to detect the identifier 22 over time to effectively track the location and/or the movement of the identifier 22 and its tableware 20. Additionally or alternatively, the camera(s) (which may be considered to be or to operate as the detector(s) 12 for the identifier 22 and/or may operate in addition to the detector(s) 12 that track a tag or other code identifier 22 via techniques other than image processing techniques) may track the location and/or the movement of the tableware 20. For example, the camera(s) may capture images of the environment and provide the images of the environment to the controller 14. Then, the controller 14 may apply computer vision techniques (e.g., template matching, item recognition, gesture recognition) to track the location and/or the movement of the tableware 20. Indeed, analysis of the images may be used to determine any of a variety of data, including the type of the tableware 20, the type of food item(s) served to the user, the location of the food item(s), the movement of the food item(s), the location of the user, the movement of the user, and/or the body position of the user. Further, it should be appreciated that the detector(s) 12 may be omitted and/or any of the one or more sensors 30 may be utilized alone or in any combination to collect any of the data described herein.

It should also be appreciated that the one or more sensors 30 may include one or more proximity sensors (e.g., capacitance sensors) located in the tableware 20. The one or more proximity sensors may be configured to detect an object, such as via a detectable tag (e.g., metal tag, magnet) embedded in the object. As an example, the one or more proximity sensors may be positioned on a tabletop, and may be configured to detect a food container (e.g., a plate or a cup) when the food container is within a range of the one or more proximity sensors. As another example, the one or more proximity sensors may be positioned on a plate, and may be configured to detect cutlery (e.g., utensil) when the cutlery is within a range of the one or more proximity sensors. In such cases, the data obtained by the one or more proximity sensors is indicative of the position and/or the movement of one item relative to another item (e.g., the cutlery relative to the plate). The one or more proximity sensors may transmit the data to the controller 14 for processing and to facilitate the disclosed techniques.

It should be appreciated that multiple proximity sensors may be positioned about the plate, such as a first proximity sensor at a first quadrant of the plate and a second proximity sensor at a second quadrant of the plate. Further, it may be known (e.g., input to the controller 14 via an operator and/or via analysis of images captured by the camera(s)) that the first quadrant contains a first food item and the second quadrant contains a second food item. Then, upon detection of the cutlery by the first proximity sensor, the controller 14 may initiate a first special effect(s), such as laughing sounds and imagery of a hyena. Then, upon detection of the cutlery by the second proximity sensor, the controller 14 may initiate a second special effect(s), such as imagery of a dragon and shaking haptic stimuli. In this way, the special effect(s) may be responsive to the position and/or the movement of the cutlery-type tableware, interactions between different pieces of the tableware 20, interactions between the tableware 20 and the food items, as well as the type of the food items. It should be appreciated that the one or more sensors 30 may be arranged in other ways, such as on the cutlery-type tableware. For example, proximity sensor(s) that detect features of the plate, cameras that capture images of a tip of the cutlery and/or surrounding area, and/or detector(s) 12 that detect tags/codes on the plate may be coupled to the cutlery-type tableware. Thus, the data may be obtained at the cutlery-type tableware and transmitted to the controller 14 for processing and to facilitate the disclosed techniques.

The controller 14 also may include components to facilitate operator interaction with aspects of the foodware system 10, such as a display screen and/or input/output devices that enable the operator to check current operating parameters, input desired operating parameters, check error logs and historical operating parameters, and so forth. For example, the controller 14 may display information that corresponds to any of the data provided to the controller 14, such as the type of food item(s) served to the user, as well as a current special effect being provided to the user, such as a current sound being output by the speaker(s) 24. In this way, the operator may supervise the experience and/or provide inputs to adjust the experience for the user. However, it should be appreciated that the experience may be dynamically controlled and/or entirely automated based on the data received from the detector(s) 12 and/or other detection devices (e.g., camera(s)) in the environment, (e.g., only via indirect inputs of the user, such as via manipulation of the tableware 20 by the user and/or consumption of the food item(s) by the user and/or historical data related to the user, and/or without any selections or inputs by the operator at the controller 14).

The controller 14 may include a programmable logic controller (PLC) or other suitable control device. The controller 14 may include the processor(s) 16 that are configured to execute software programs to control the speaker(s) 24, the display device(s) 26, and/or the haptic device(s) 28. For example, the processor(s) 16 may control a time and a strength of sound emitted by the speaker(s) 24, projection of light from projector(s) that operate as the display device(s) 26, and so forth. The processor(s) 16 may process instructions and/or information (e.g., the software programs, lookup tables, historic data) stored in the memory device(s) 18. The processor(s) 16 may include hardware-based processor(s), each including one or more cores. Moreover, the processor(s) 16 may include multiple microprocessors, one or more "general-purpose" microprocessors, one or more system-on-chip (SoC) devices, one or more special-purpose microprocessors, one or more application specific integrated circuits (ASICs), and/or one or more reduced instruction set computer (RISC) processors. The processor(s) 16 may be communicatively coupled to the one or more sensors 30, the speaker(s) 24, the display device(s) 26, and/or the haptic devices 28. The controller 14 also includes, or is associated with, input/output circuitry for receiving the data from the one or more sensors 30 and interface circuitry for outputting control signals.

The memory device(s) 18 may include a tangible, non-transitory, machine-readable medium, such as a volatile memory (e.g., a random access memory [RAM]) and/or a nonvolatile memory (e.g., a read-only memory [ROM], flash memory, a hard drive, and/or any other suitable optical, magnetic, or solid-state storage medium). The memory device(s) 18 may store a variety of information that may be used for various purposes. For example, the memory device(s) 18 may store machine-readable and/or processor-executable instructions (e.g., firmware or software) for the processor(s) 16 to execute to output special effects in response to the data, such as to output particular sounds in response to particular movements of a piece of cutlery-type tableware 20 relative to the food item(s), for example. As another example, the memory device(s) 18 may store instructions that cause the processor(s) 16 to regulate the audio data (e.g., binaural audio) to achieve a desired presentation by, for example, controlling an actuator coupled to the speaker(s) 24 to move the speaker(s) 24 relative to the head of the user and/or calibrating the projector to accurately project visual imagery onto the tableware 20, the food item(s), and/or on a display screen (e.g., a table surface, table cloth, tray, placemat, plate, charger) so that the visual imagery is readily visible at the location of the tableware 20, at the location of the food item(s), and/or at the location of the display screen.

Figure 2:
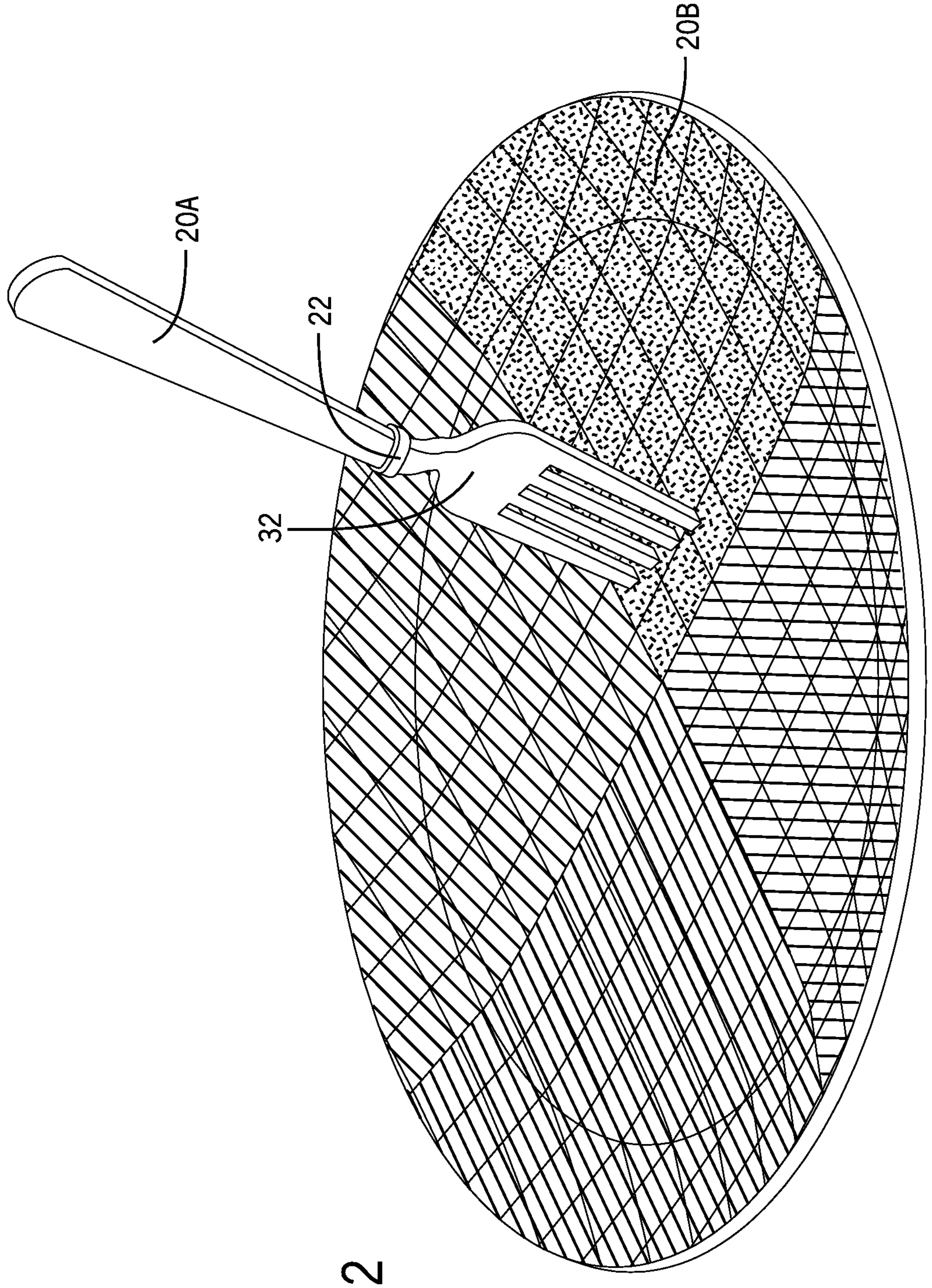
FIG. 2 is a schematic illustration of tableware that may be used in the foodware system of FIG. 1, in accordance with an embodiment of the present disclosure.

FIG. 2 is a schematic illustration of an embodiment of the tableware 20 (e.g., cutlery 20A and plate 20B) that may be used in the foodware system 10 of FIG. 1. As illustrated, a respective identifier 22 may be coupled to one piece of the tableware 20, such as to the cutlery 20A. The identifier 22 is coupled to the cutlery 20A via a coupler 32, such as a band, that is disposed about the cutlery 20A. However, it should be appreciated that the identifier 22 may be coupled to the cutlery 20A in other ways (e.g., via an adhesive) and/or integrated into (e.g., embedded) within the cutlery 20A. As noted herein, the identifier 22 may be removably coupled to the cutlery 20A so that the identifier 22 can be reused with multiple different pieces of tableware 20 (e.g., of the same type and different types; of the same type, such as only of the same type via only being designed to fit around small handles of cutlery). Alternatively, the identifier 22 may be configured to remain coupled to the cutlery 20A so that the identifier 22 is only associated with the cutlery 20A over time (e.g., permanently associated with the cutlery 20A in the lookup tables).

With reference to FIGS. 1 and 2, the detector(s) 12 and/or the one or more other sensors 30 may collect the data that is indicative of the location and/or the movement of the cutlery 20A relative to the plate 20B. Further, the one or more sensors 30 may collect the data that is indicative of the type of the tableware 20, the type of food item(s) served to the user, the location of the food item(s), the movement of the food item(s), the location of the user, the movement of the user, and/or the body position of the user. For example, together the data may indicate that the cutlery 20A is located on a portion of the plate 20B that includes a food item (e.g., pasta).

The one or more sensors 30 may send such data to the controller 14. Then, in response to determining that the user is moving the cutlery 20A toward the food item (e.g., within a threshold distance of the food item) and/or that the user has placed the cutlery 20A on the food item (e.g., in contact with the food item), the controller 14 may instruct the speaker(s) 24 to output sound effects, such as selected sound effects that represent or imitate laughing in response to being tickled. It should be appreciated that the selected sound effects may include any of a variety of sounds, including sound that represent screaming, laughing, and/or spoken phrases (e.g., "Please eat me!"). Further, using binaural audio techniques, the speaker(s) 24 may output the sound effects in a manner that causes the user to hear and/or interpret the sound effects as originating from the food item.

As noted herein, the controller 14 may derive any of a variety of information from the data. For example, in response to determining that the user is moving the cutlery 20A (e.g., with at least a portion of the food item) away from the plate 20B and/or toward a mouth of the user, the controller 14 may control a strength of the audio data output by the speaker(s) 24 (e.g., increase or decrease a volume of the sounds). For example, as the cutlery 20A nears the mouth of the user, the speaker(s) 24 may emit louder sounds (e.g., yelling, "Please eat me!") that appear to originate from the food item.

In one embodiment, the plate 20B may include a coordinate grid and/or may be color coded (e.g., different colors in different regions) to facilitate detection of the food item(s) and/or other parameters via the one or more sensors 30. For example, the food item(s) may be arranged or plated in a particular, known manner, such as with a first type of food item (e.g., vegetables) in a first portion of the coordinate grid/color on the plate 20B, a second type of food item (e.g., bread) in a second portion of the coordinate grid/color on the plate 20B, and so on. This allows for detection of activity relative to a particular food item and presentation of effects based on this. In one embodiment, upon detecting that the cutlery 20A is located at (e.g., overlaps with) the first portion via detection of the identifier 22 (or via detection of the cutlery 20A with the one or more other sensors 30), the detector(s) 12 (or the one or more other sensors 30) sends the data indicative of the location of the cutlery 20A to the controller 14. To facilitate this, multiple detector(s) 12 may be positioned about the plate (e.g., associated with respective quadrants of the plate 20B), although other configurations and techniques are envisioned. Then, based the type of food item at the location, the controller 14 may select special effects and instruct the speaker(s) 24, the display device(s) 26, and/or the haptic device(s) 28 to output the special effects. In one embodiment, the one or more sensors 30 may be triggered to transmit the data in this way (e.g., upon detection of the identifier 22 and/or the cutlery 20A). However, additionally or alternatively, the one or more sensors 30 may periodically and/or continuously transmit the data to the controller 14 for processing (e.g., at least during the dining experience of the user).

Figure 3:
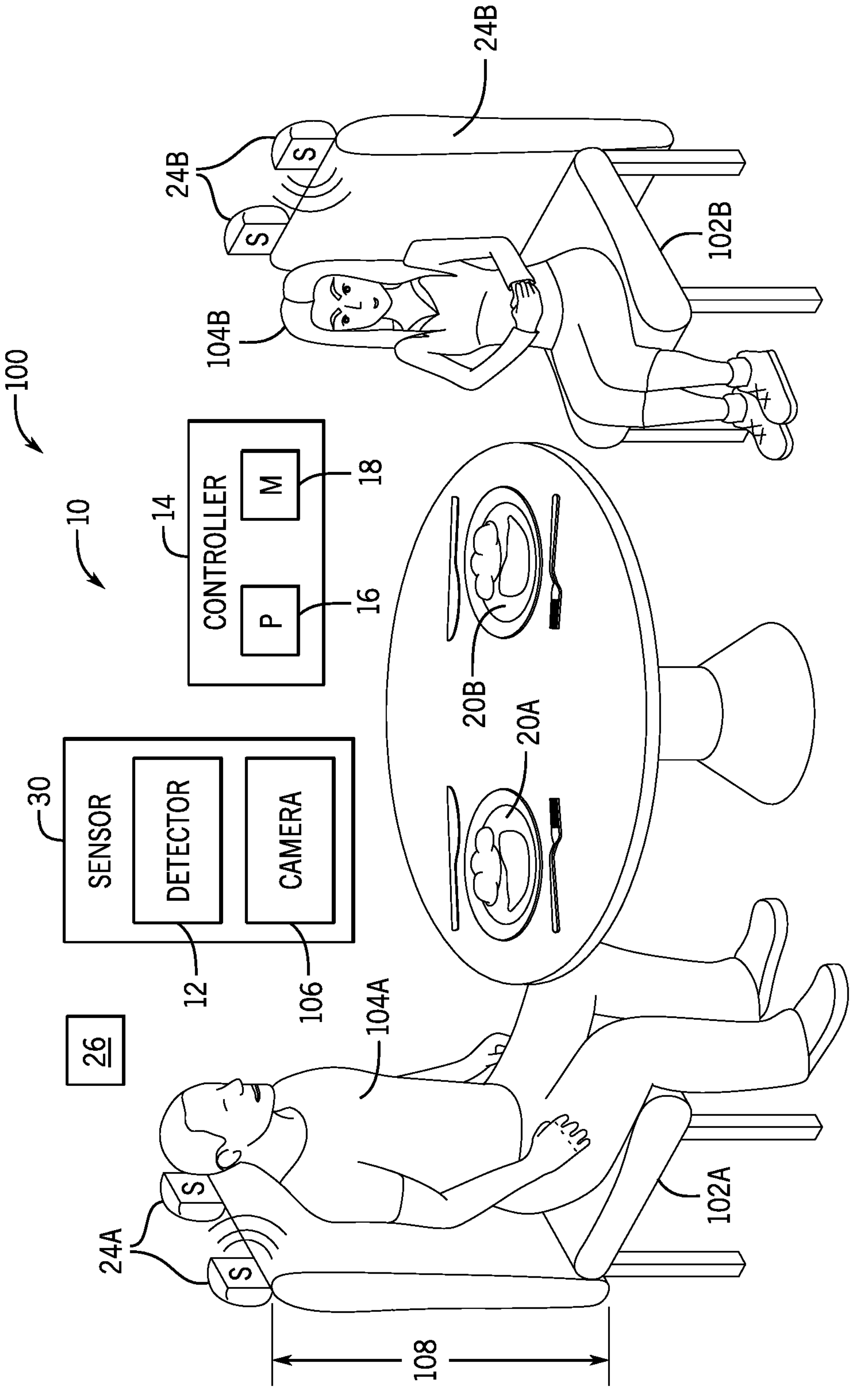
FIG. 3 is a schematic illustration of the foodware system of FIG. 1 in use within a dining environment, in accordance with an embodiment of the present disclosure.

FIG. 3 is a schematic illustration of an embodiment of a dining environment 100 that includes the foodware system 10. As shown, the dining environment 100 includes tableware 20 and seats 102 (e.g., chairs) associated with respective users 104 (e.g., a first seat 102A with a first user 104A, and a second seat 102B with a second user 104B). The dining environment 100 also includes the one or more sensors 30, which may include at least the detector(s) 12 and/or a camera(s) 106. As noted herein, in one embodiment, the camera(s) 106 may be considered to be at least one of the detector(s) 12 that detect the identifier 22 and/or capture images with the identifier 22. However, the detector(s) 12 may be readers/scanner that are different than the camera(s) 106, and the camera(s) 106 may be used to detect other features and/or capture images with other features to facilitate the disclosed techniques.

Each seat 102 may include a number of discrete speakers 24, and the speaker(s) 24 may be any suitable size or shape. In one embodiment, two speakers, such as the speakers 24A and 24B, may be coupled to seatbacks of respective seats 102A and 102B. Further, the seats 102A and 102B may include one or more actuators that are configured to adjust respective positions of the speaker(s) 24 (e.g., relative to the users 104). For example, the one or more actuators may drive a back of the seat 102 lower or higher relative to a bottom of the seat 102 (e.g., as shown by arrow 108) to thereby adjust a vertical position of the speaker(s) 24 relative to the user 104. In this way, the speaker(s) 24 may be positioned near the head of the user 104. As such, binaural audio generated by the speaker(s) 24A is customized for the first user 104A based on the location of the tableware 20 associated with the first user 104A, the movement of the tableware 20 associated with the first user 104A, the type of food item(s) contacted by cutlery-type tableware 20 held by the first user 104A, the food item(s) consumed by the first user 104A, the eating habits of the first user 104A, and so on. Similarly, binaural audio generated by speaker(s) 24B is customized for the second user 104B based on the same or similar parameters (e.g., any of the parameters set forth herein). Users (and their positioning) may be monitored (e.g., via facial recognition or other attribute recognition, including anonymous attribute recognition) and positioning of the speakers for a particular seat may be adjusted to accommodate the user positioned in the particular seat.

The one or more sensors 30 may include the detector(s) 12, the camera(s) 106, motion sensor(s), food weight sensor(s), food displacement sensor(s), and/or other suitable sensors. The one or more sensors 30 may be positioned at any of a variety of positions about the dining environment 100. For example, the detector(s) 12 and/or the camera(s) 106 may be positioned above the tableware 20 (e.g., suspended from and/or coupled to a ceiling of the dining environment 100). As another example, the motion sensor(s), the food weight sensor(s), and/or the food displacement sensor(s) may be coupled to the tableware 20. In this way, the motion sensor(s) may detect movement of the tableware 20 (e.g., the cutlery, a cup), while the food weight sensor(s) and/or the food displacement sensor(s) may detect changes in amount and/or position of the food item(s) on the tableware 20 (e.g., the plate, the cup). In response to any change in the amount and/or position of the food item(s), the controller 14 may instruct certain special effects, such as certain sounds via the speaker(s) 24 and/or projected images onto the food item(s) (e.g., sounds are emitted to simulate screams from the food item(s)). Further, data from the food weight sensor(s) and/or the food displacement sensor(s) may indicate relocation of the food item(s) from one plate to another plate. In response to the relocation of the food item(s), the controller 14 may instruct certain special effects, such as certain sounds via the speaker(s) 24 and/or projected light or images onto the food item(s) (e.g., via the projected light or images, the food item appears to change color once it is transferred to another plate). Although certain examples herein include the identifier(s) 22 in the tableware 20, it should be appreciated that the identifier(s) 22 may be located in other items, including the food item(s). For example, a bar code may be embedded in frosting or a QR code may be embedded in a cake topper. Further, the identifier(s) 22 may include particular colors of the food item(s), such as sprinkles on a cookie or red strawberries. Thus, the food item(s) may be detected and/or monitored directly via the detector(s) 12 and/or the camera(s) 106, which may be coupled to the tableware 20 (e.g., the cutlery) and/or in any other suitable location. This may also facilitate determination of relative positions and/or interactions between the food item(s) and the tableware 20 (e.g., the cutlery).

Generally, as noted herein, the data collected by the one or more sensors 30 may be provided to the controller 14. Then, the controller 14 may instruct the speaker(s) 24 to output sounds and/or control the display device(s) 26 to project and/or display visual imagery, among other special effects. For example, the other special effects may include haptic effects generated by shaking the table and/or the seats 102, flowing an air flow at the users 104, releasing a scent around the users 104, or the like. As another example, the other special effects may include illuminating and/or turning off light emitters around the dining environment 100 (e.g., to darken the dining environment 100). The one or more sensors 30 may separately track the tableware 20 associated with each of the users 104 to thereby provide personalized experiences for the users 104 (e.g., as the first user 104A contacts a first food item on their own plate 20A, the speaker(s) 24A output a laughing sound; however, as the second user 104B contacts the first food item on their own plate 20B, the speaker(s) 24B output a comical screaming sound). The personalized experiences for the users 104 may be based on historic data for each of the users 104, such as whether certain effects were received positively (e.g., the user 104 continued to eat the food item) or negatively (e.g., the user 104 stopped eating the food item for at least a threshold period of time and/or left the food item on the plate at the conclusion of the meal) during previous dining experiences. It is envisioned that any special effects disclosed herein may be provided in response to any data and/or combinations of data (e.g., parameters) disclosed herein.

It should be appreciated that in addition to facilitating the special effects during the dining experience, the data collected by the one or more sensors 30 may be used to inform and/or improve operations in the dining environment 100. For example, macaroni and cheese may be a popular food item that is ordered by users; however, the data from the food weight sensors (and/or one or more of the other sensors 30, such as the camera(s) 106) may indicate that the macaroni and cheese has remained on plates of a number of users. In response, the controller 14 may recommend and/or the restaurant may choose to alter their menu and/or prepare the macaroni and cheese in a different manner to satisfy the users. Further, the one or more sensors 30 may include a microphone(s) that capture sounds produced by the users 104 as they consume the food item(s). The controller 14 may analyze the sounds to determine whether the users 104 enjoyed the food item(s) (e.g., via comparison of the sounds to sound signatures that are associated with different emotions/states). In one embodiment, the data may be input into a machine learning model, which may output recommendations to adjust food recipes, menu items, and so forth based on eating habits and patterns of the users over time.

Figure 4:
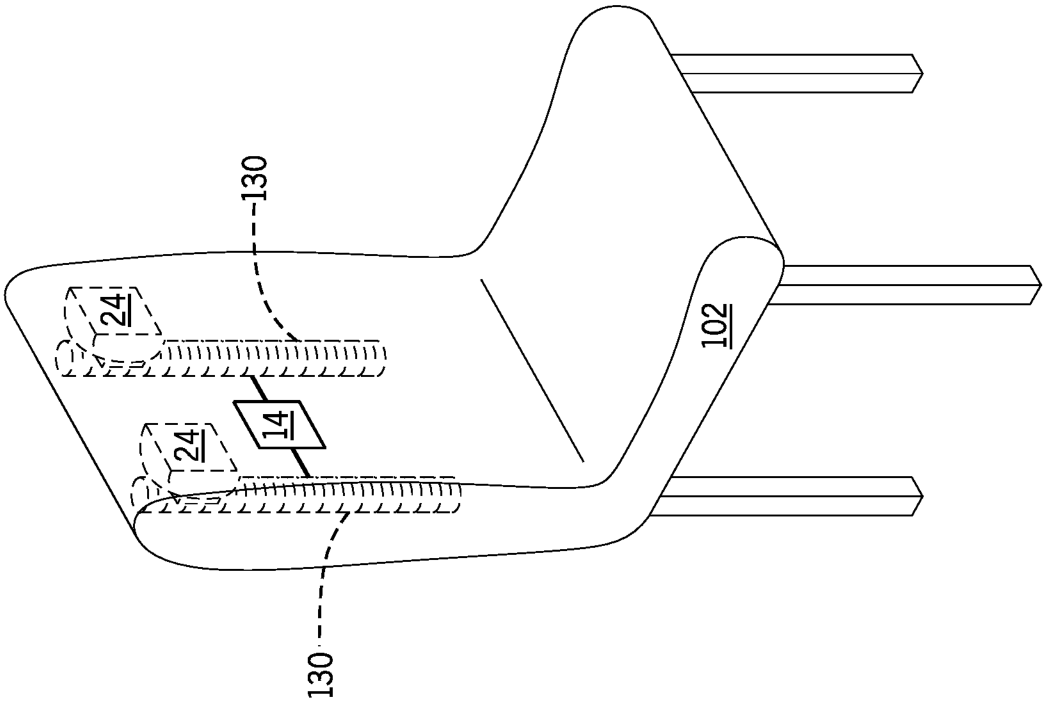
FIG. 4 is a schematic illustration of a user seat that may be used in the foodware system of FIG. 1, in accordance with an embodiment of the present disclosure.

FIG. 4 is a schematic illustration of an embodiment of a seat 102 with the speaker(s) 24 that may be used in the foodware system 10 of FIG. 1. As mentioned above, binaural audio may provide an immersive experience to the user by localizing sounds based on orientation and/or movement of a head of the user. To account for differences in height of the user (e.g., adult versus child), the speaker(s) 24 may be automatically and/or mechanically moved based on a location and/or an orientation of the head of the user. For example, the seat 102 may include one or more rails 130 on which a number of discrete speaker(s) 24 are disposed. The control 14 may provide signals to an actuator(s), which may drive the speaker(s) 24 to move along a respective rail(s) 130, such that the speaker(s) 24 are positioned appropriately near the head of the user to provide the binaural audio. For example, the speaker(s) 24 may be disposed at a lower location along the respective rail(s) 130 if the user has a first, smaller height (e.g., the user is a child). However, the speaker(s) 24 may be disposed at a higher location along the respective rail(s) 130 if the user has a second, larger height (e.g., the user is an adult). The heights of the users may be gathered from the historic data (e.g., which may include user profiles), input by the users and/or an operator of the dining experience, and/or determined via analysis of the data obtained by the one or more sensors (e.g., the images captured by the camera(s)). In one embodiment, the user and/or the operator may manually adjust the speaker(s) 24 to position the speaker(s) near the head of the user.

Figure 5:
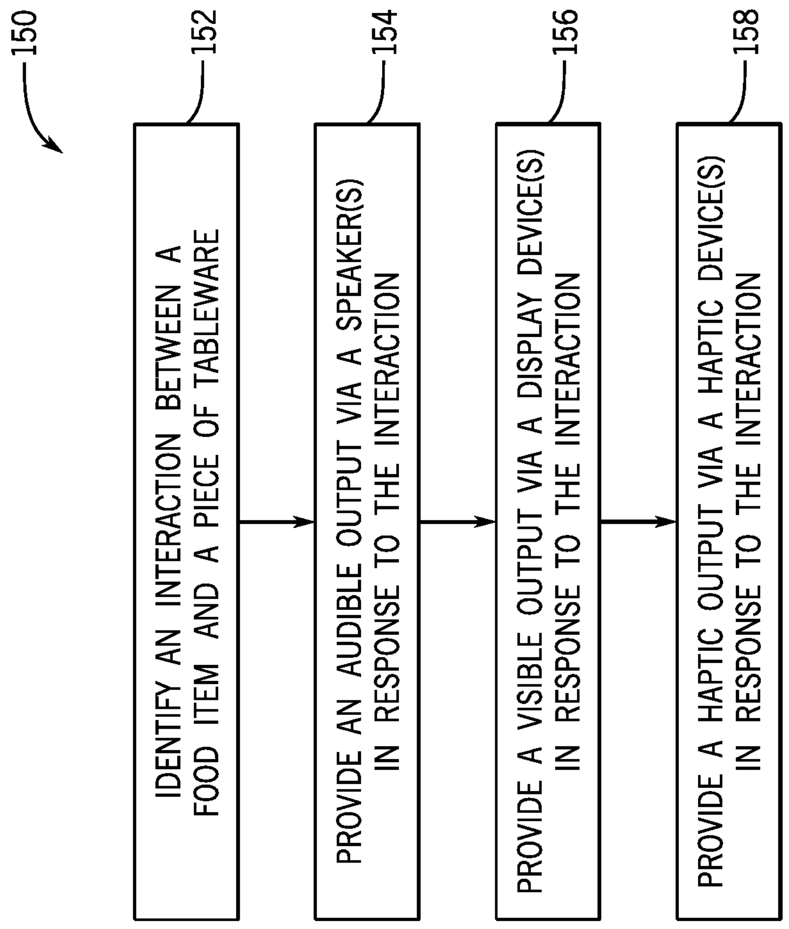
FIG. 5 is a flow diagram of a process for generating auditory stimuli via the foodware system of FIG. 1, in accordance with an embodiment of the present disclosure.

With the preceding in mind, FIG. 5 is a flow diagram of an embodiment of a process 150 for generating binaural audio via a foodware system, such as the foodware system 10 of FIG. 1. Any suitable device (e.g., the processor(s) 16) may perform the process 150. In one embodiment, the process 150 may be implemented by executing instructions stored in a non-transitory, computer-readable medium (e.g., the memory device(s) 18). While the process 150 is described using blocks in a specific order, it should be understood that the present disclosure contemplates that the blocks may be performed in any suitable order, certain blocks may be omitted, and/or other blocks may be added.

At block 152, a processor(s) may identify an interaction between a food item and a piece of tableware (e.g., a cutlery-type piece of tableware, such as a fork, a knife, or a spoon). For example, the processor(s) may receive data from one or more sensors, including data indicative of an identifier coupled to the piece of tableware, data indicative of a location of the piece of tableware, data indicative of a movement of the piece of tableware, and/or data indicative of a type of the food item, and so forth. The interaction may include contact between the food item and the piece of tableware, initiating and/or sustaining (e.g., for a threshold time, such as one second) movement of the piece of tableware toward the food item, reaching a threshold distance between the food item and the piece of tableware, and/or carrying the food item toward a mouth of a user via the piece of tableware, and so forth. For example, data from the one or more sensors (e.g., signals from the detector(s) and/or images captured by cameras) may indicate that the user has inserted a spoon into a bowl of soup to contact the soup, that the user is moving a knife toward a piece of bread and/or the knife is within the threshold distance of the piece of bread, and/or that the user is carrying a bite of cake toward the mouth of the user.

At block 154, the processor(s) may instruct a speaker(s) to provide an audible output in response to the interaction. In one embodiment, the processor(s) may instruct the speaker(s) to provide binaural audio such that the audio data appears to be projected from the food item. For example, when the user contacts the cake, the speaker(s) may output sounds to provide an effect of the cake singing "Happy Birthday." The processor(s) may also control one or more actuators to move the speaker(s), as described herein. The speaker(s) may be located on a seat occupied by the user and/or in any other suitable location about the dining environment.

At block 156, the processor(s) may instruct the one or more display device(s) to provide a visible output in response to the interaction. In one embodiment, the processor(s) may instruct the display device(s) to project images onto the food item and/or in a vicinity of the food item (e.g., onto a plate that supports the food item; onto a cup that holds the food item; onto a table that supports the plate or the cup with food item; onto the user or another user at the table). For example, when the user contacts the cake, the display device(s) may project an image of a monster onto the cake. The processor(s) may also coordinate the sounds from the speaker(s) with the images from the display device(s). For example, the sounds may include phrases and/or laughing and the images may include the monster with their mouth moving substantially in sync with the phrases and/or laughing. The display device(s) may be located on a ceiling and/or any other suitable location in the dining environment.

At block 158, the processor(s) may instruct the one or more haptic device(s) to provide a haptic output in response to the interaction. For example, the processor(s) may instruct the haptic device(s) to shake a table that supports the food item, flow an air flow at the user, release a scent in the vicinity of the user, or the like. The processor(s) may also coordinate the sounds from the speaker(s), the images from the display device(s), and/or the haptic outputs from the haptic device(s). For example, the images may include a flame and the haptic outputs may include a warm air flow direct at the user substantially in sync with the flame. The haptic device(s) may be located on the table, the seat, the tableware, the ceiling, the walls, and/or any other suitable location in the dining environment. Indeed, in one embodiment, the one or more sensors, the speaker(s), the display device(s), and/or the haptic device(s) may be coupled to the table, the seat, the ceiling, the walls, the tableware (e.g., the cutlery-type tableware, the plate, the cup), and/or in any other suitable location of the dining environment.

It should be appreciated that the foodware system may provide any of a variety of interactive special effects in response to any of a variety of events in the dining environment. For example, the processor(s) may track movement of the plate prior to the plate being presented to the user and/or as the plate is delivered to the user. Based on determining that the plate has been delivered to the user (e.g., set on a table), the processor(s) may instruct the speaker(s) and/or the haptic device(s) to generate auditory and haptic stimuli, respectively. For example, the user may hear a thumping sound effect and feel their seat shaking in response to and/or as the plate being set on the table. In one embodiment, the processor(s) may leverage binaural audio, visual imagery, and/or haptic stimuli to create a storyline during the dining experience. The different meals of the dining experience (e.g., appetizer, entrée, dessert) may correspond to different parts of the storyline. Other variations are envisioned as well. For example, the foodware system may also be configured to more generally identify an interaction between a food item and the user, via hands of the user (e.g., the user picks up a cookie), via other movements (e.g., chewing movements), and/or via the piece of tableware (e.g., the user moving the cup to take a drink, the user moving a knife to cut bread). In response, the foodware system may provide any of a variety of special effect(s), such as any of the special effect(s) disclosed herein.

While only certain features of the disclosure have been illustrated and described herein, many modifications and changes will occur to those skilled in the art. It is, therefore, to be understood that the appended claims are intended to cover all such modifications and changes as fall within the true spirit of the present disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A foodware system, comprising:

an identifier coupled to a utensil configured to be used by a user to engage a food item;

a detector configured to generate data indicative of a location of the utensil, a movement of the utensil, or both based on detection of the identifier; and a controller communicatively coupled to the detector and configured to instruct a speaker to generate audio data based on the location of the utensil, the movement of the utensil, or both.

2. The foodware system of claim 1, wherein the audio data comprises binaural audio data to provide an effect of the audio data seeming to project from the food item.

3. The foodware system of claim 1, wherein the identifier comprises a radio frequency identification (RFID) tag, a near-field communication (NFC) tag, a barcode, a quick response (QR) code, or any combination thereof.

4. The foodware system of claim 1, wherein the detector comprises a radio frequency identification (RFID) reader, a near-field communication (NFC) reader, a barcode scanner, a quick response (QR) code scanner, or any combination thereof.

5. The foodware system of claim 1, comprising a camera configured to capture images that represent the location of the utensil, the movement of the utensil, a user movement of the user, a type of the food item, a food location of the food item, a food movement of the food item, or any combination thereof.

6. The foodware system of claim 1, comprising:

a food displacement sensor configured to detect a food movement of the food item;

a weight sensor configured to detect a weight of the food item;

a motion sensor configured to detect a user movement of the user, the movement of the utensil, or both; or any combination thereof.

7. The foodware system of claim 1, comprising the speaker coupled to a chair configured to support the user, wherein the controller is configured to cause an actuator to move the speaker relative to a position of a head of the user.

8. The foodware system of claim 1, wherein the controller is configured to dynamically project an image onto the food item, onto tableware that supports the food item, or both based on the location of the utensil, the movement of the utensil, or both.

9. The foodware system of claim 1, wherein the controller is configured to instruct a haptic device to provide haptic stimuli based on the location of the utensil, the movement of the utensil, or both.

10. The foodware system of claim 1, wherein the controller is configured to instruct the speaker to generate the audio data in response to the location of the utensil, the movement of the utensil, or both indicating contact between the utensil and the food item.

11. The foodware system of claim 1, wherein the detector is coupled to a plate that supports the food item.

12. A method of providing an immersive dining experience, the method comprising:

identifying, via one or more processors and based on data obtained by one or more sensors, an interaction between a food item and a user; and projecting, via a projector, an image onto the food item in response to the interaction between the food item and the user;

wherein identifying the interaction between the food item and the user comprises identifying initiation of movement of a utensil held by the user toward the food item, sustained movement of the utensil toward the food item for a threshold time, the utensil being within a threshold distance of the food item, the food item being moved toward a mouth of the user via the utensil, or any combination thereof.

13. The method of claim 12, comprising outputting, via a speaker, audio data in response to the interaction.

14. The method of claim 12, comprising outputting, via a haptic device, haptic stimuli in response to the interaction.

15. The method of claim 12, wherein the data comprises images captured by a camera, proximity data obtained by one or more proximity sensors, relative location data obtained by one or more radio frequency identification (RFID) readers, or any combination thereof.

16. The method of claim 12, comprising selecting the image based on a type of the food item, historic data related to the user, or both.

17. A foodware system, comprising:

one or more sensors configured to obtain data indicative of an interaction between a food item and a user, wherein the data indicative of the interaction between the food item and the user comprises data indicative of contact between the food item and a utensil held by the user, initiation of movement of the utensil held by the user toward the food item, sustained movement of the utensil toward the food item for a threshold time, the utensil being within a threshold distance of the food item, the food item being moved toward a mouth of the user via the utensil or any combination thereof; and a controller communicatively coupled to the one or more sensors and configured to:

select an image based on a type of the food item, historic data related to the user, or both; and instruct a projector to project the image onto the food item in response to identifying the interaction between the food item and the user.

18. The foodware system of claim 17, wherein the controller is configured to instruct a speaker to generate audio data in response to identifying the interaction between the food item and the user.

19. The foodware system of claim 17, wherein the controller is configured to:

identify the contact between the food item and the utensil held by the user based on the data, and instruct the projector to project the image onto the food item in response to identifying the contact between the food item and the utensil held by the user.

* * * * *